US012730679B2

(12) United States Patent
Wu et al.

(10) Patent No.: US 12,730,679 B2
(45) Date of Patent: Sep. 8, 2026

(54) SIGNAL PROCESSING BY DISTRIBUTING REAL AND IMAGINARY PART OF TRANSFORM KERNEL MATRIX AND TIME DOMAIN SIGNAL TO MULTICORE CLUSTERS

(71) Applicant: LYNXI TECHNOLOGIES CO., LTD., Beijing (CN)

(72) Inventors: Zhenzhi Wu, Beijing (CN); Wei He, Beijing (CN); Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 443 days.

(21) Appl. No.: 18/276,372

(22) PCT Filed: Jan. 20, 2022

(86) PCT No.: PCT/CN2022/072991

§ 371 (c)(1),
(2) Date: Aug. 8, 2023

(87) PCT Pub. No.: WO2022/166605

PCT Pub. Date: Aug. 11, 2022

(65) Prior Publication Data

US 2024/0118932 A1 Apr. 11, 2024

(30) Foreign Application Priority Data

Feb. 8, 2021 (CN) ......................... 202110181650.0

(51) Int. Cl.
*G06F 9/50* (2006.01)
*G06F 15/00* (2006.01)
(Continued)

(52) U.S. Cl.
CPC .......... *G06F 9/5038* (2013.01); *G06F 9/5066* (2013.01); *G06F 15/00* (2013.01); *G06F 15/163* (2013.01); *G06F 17/14* (2013.01)

(58) Field of Classification Search
None
See application file for complete search history.

(56) References Cited

U.S. PATENT DOCUMENTS 5,903,483 A 5/1999 Bond
12,475,189 B1 * 11/2025 Pisha .................... G06F 17/141
(Continued)

FOREIGN PATENT DOCUMENTS

CN 101478674 A 7/2009
CN 104656073 A 5/2015
(Continued)

OTHER PUBLICATIONS

WIPO, International Search Report issued on Mar. 23, 2022.

*Primary Examiner* — Abu Zar Ghaffari
(74) *Attorney, Agent, or Firm* — Li & Cai Intellectual Property (USA) Office

(57) ABSTRACT

Provided is a signal processing method including: determining, according to a time domain signal to be processed and a time-frequency transform type of the time domain signal, a transform kernel matrix of the time domain signal; mapping the transform kernel matrix to a plurality of processing cores of the many-core chip; and mapping the time domain signal to the plurality of processing cores so that the plurality of processing cores determine, according to the transform kernel matrix and the time domain signal, a frequency domain signal corresponding to the time domain signal.

11 Claims, 5 Drawing Sheets

(51) Int. Cl.
*G06F 15/163* (2006.01)
*G06F 17/14* (2006.01)

(56) References Cited

U.S. PATENT DOCUMENTS

| | | | | |
|---|---|---|---|---|
| 2006/0085497 | A1* | 4/2006 | Sehitoglu | G06F 17/142 708/405 |
| 2012/0155482 | A1* | 6/2012 | Chang | H04L 49/109 370/401 |
| 2014/0101219 | A1* | 4/2014 | Tang | G06F 17/142 708/403 |
| 2014/0294181 | A1* | 10/2014 | Kamano | G10L 19/008 704/500 |
| 2016/0073198 | A1* | 3/2016 | Vilermo | H04R 3/005 381/26 |
| 2018/0158181 | A1* | 6/2018 | Kulkarni | G06N 20/10 |
| 2018/0199145 | A1* | 7/2018 | Franck | H04S 3/004 |
| 2019/0158157 | A1* | 5/2019 | Ma | H04L 25/022 |
| 2019/0384803 | A1* | 12/2019 | Lee | G06F 17/141 |
| 2022/0053494 | A1* | 2/2022 | Shattil | H04L 27/26035 |
| 2022/0100813 | A1* | 3/2022 | Lagudu | G06F 17/16 |

FOREIGN PATENT DOCUMENTS

| | | | |
|---|---|---|---|
| CN | 105426602 | A | 3/2016 |
| CN | 111538005 | A | 8/2020 |

* cited by examiner

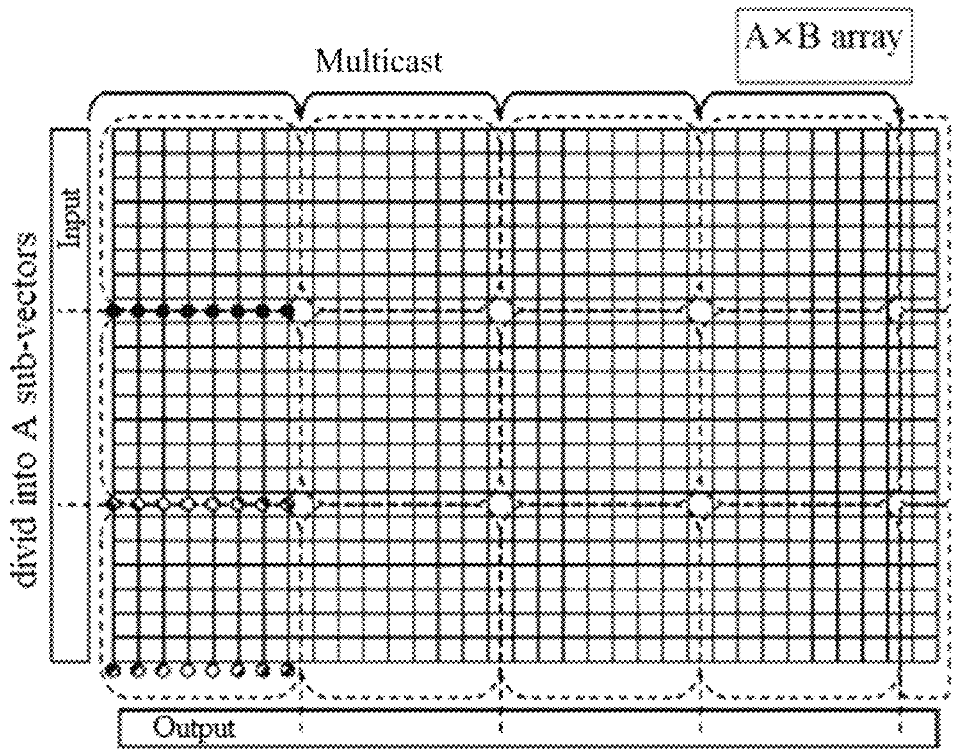
Amended FIG. 8
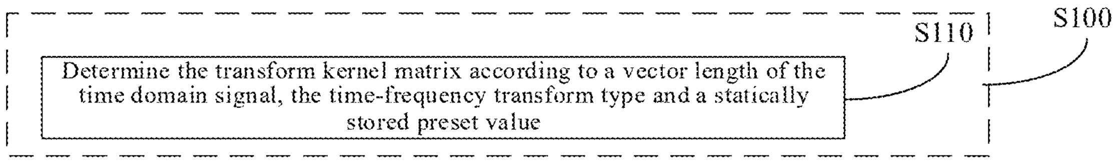
FIG. 9
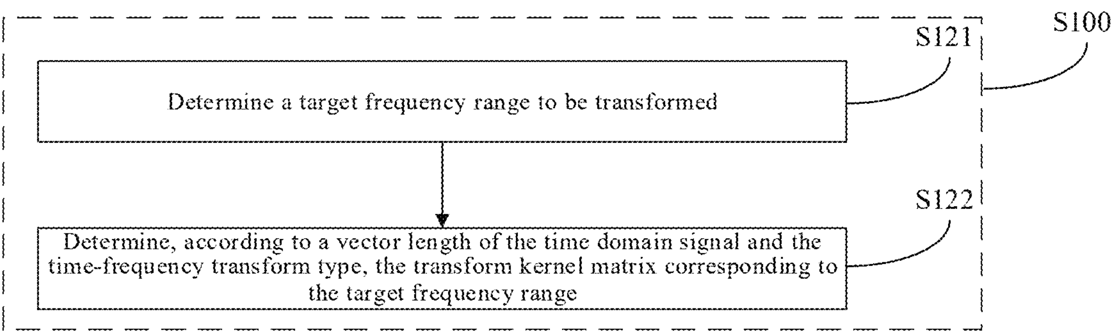
FIG. 10

SIGNAL PROCESSING BY DISTRIBUTING REAL AND IMAGINARY PART OF TRANSFORM KERNEL MATRIX AND TIME DOMAIN SIGNAL TO MULTICORE CLUSTERS

CROSS-REFERENCE TO RELATED APPLICATIONS

The present application is a National Phase Application filed under 35 U.S.C. 371 as a national stage of PCT/CN2022/072991, filed on Jan. 20, 2022, an application claiming priority from Chinese Patent Application No. 202110181650.0, filed on Feb. 8, 2021 in the Chinese Intellectual Property Office, contents of which are hereby incorporated herein by reference in their entirety.

TECHNICAL FIELD

The present disclosure relates to the field of computer technology, and in particular relates to a signal processing method based on a many-core chip, an electronic device, a computer-readable medium, and a computer program product.

BACKGROUND

Common time-frequency transform types include Discrete Fourier Transform (DFT), Discrete Cosine Transform (DCT), Fast Fourier Transform (FFT), Chirp Z-Transform (CZT), and the like.

In some related art, when the time-frequency transform is implemented by a conventional efficient time-frequency transform device, the flexibility is relatively poor.

SUMMARY

The present disclosure provides a signal processing method based on a many-core chip, an electronic device, a computer-readable medium, and a computer program product.

In a first aspect, the present disclosure provides a signal processing method based on a many-core chip, including: determining, according to a time domain signal to be processed and a time-frequency transform type of the time domain signal, a transform kernel matrix of the time domain signal; mapping the transform kernel matrix to a plurality of processing cores of the many-core chip; and mapping the time domain signal to the plurality of processing cores so that the plurality of processing cores determine, according to the transform kernel matrix and the time domain signal, a frequency domain signal corresponding to the time domain signal.

In a second aspect, the present disclosure further provides an electronic device, including: a plurality of processing cores; and a network on chip configured for interacting data among the plurality of processing cores and external data, wherein one or more of the processing cores have stored thereon one or more instructions which, when executed by the one or more processing cores, cause the one or more of processing cores to implement the signal processing method according to the first aspect of the embodiments of the present disclosure.

In a third aspect, an embodiment of the present disclosure provides a computer-readable medium having a computer program stored thereon, wherein the computer program, when executed by a processing core, causes the signal processing method according to the first aspect of the embodiments of the present disclosure to be implemented.

In a fourth aspect, an embodiment of the present disclosure provides a computer program product including computer-readable codes, or a nonvolatile computer-readable storage medium having computer-readable codes stored thereon, wherein the computer-readable codes, when executed on a processor of an electronic device, cause the processor of the electronic device to implement the signal processing method according to the first aspect of the embodiments of the present disclosure.

In the embodiments of the present disclosure, the transform kernel matrix is determined according to a time domain signal and a time-frequency transform type, and by configuring the transform kernel matrix into a plurality of processing cores of a many-core chip and inputting the time domain signal into the plurality of processing cores of the many-core chip, the many-core chip can determine a frequency domain signal according to the time domain signal and the transform kernel matrix, and thus various types of time-frequency transform can be realized by the many-core chip. Further, the plurality of processing cores configured into the many-core chip may form a part of the transform kernel matrix corresponding to any interval, and the many-core chip can perform time-frequency transform for any interval, so that the computation amount can be remarkably saved, and the time-frequency transform efficiency can be improved.

It should be understood that the description in this part is not intended to identify key or essential features of embodiments of the present disclosure, nor is it intended to limit the scope of the present disclosure. Other features of the present disclosure will become apparent from the following description.

BRIEF DESCRIPTION OF DRAWINGS

Accompanying drawings are provided for further understanding of the present disclosure and constitute a part of the specification. Hereinafter, these drawings are intended to explain the present disclosure together with the following embodiments, but should not be considered as a limitation to the present disclosure. The above and other features and advantages will become more apparent to those skilled in the art through detailed description of the exemplary embodiments with reference to the accompanying drawings, in which:

FIG. 8 is a schematic diagram of an implementation of multiplication clusters according to an embodiment of the present disclosure;

FIG. 9 is a flowchart of some operations in a signal processing method based on a many-core chip according to an embodiment of the present disclosure;

FIG. 10 is a flowchart of some operations in a signal processing method based on a many-core chip according to an embodiment of the present disclosure;

DETAIL DESCRIPTION OF EMBODIMENTS

Figure 1:
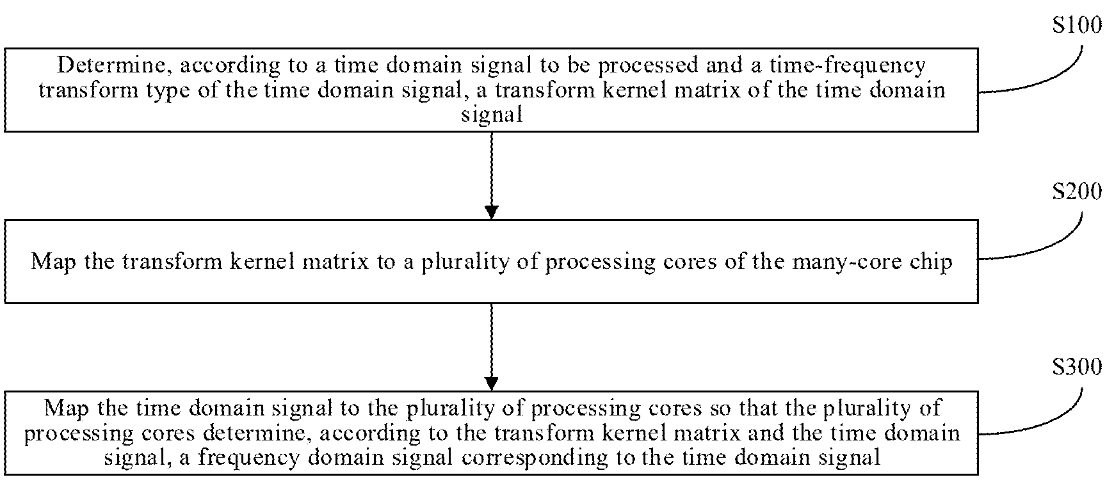
FIG. 1 is a flowchart of a signal processing method based on a many-core chip according to an embodiment of the present disclosure.

The present disclosure will now be further described in detail below in conjunction with the drawings and exemplary embodiments. It will be appreciated that the specific embodiments described herein are used merely for the purpose of explaining the present disclosure instead of limiting the present disclosure. It should be further noted that, for the convenience of description, merely some of the structures associated with the present disclosure, not all the structures, are shown in the drawings.

In order to make those skilled in the art better understand the technical solutions of the present disclosure, exemplary embodiments of the present disclosure will be described below in conjunction with the accompanying drawings, in which various details of the embodiments of the present disclosure are included to assist understanding, and should be considered as being merely exemplary. Therefore, those of ordinary skill in the art will recognize that various changes and modifications of the embodiments described herein can be made without departing from the scope and spirit of the present disclosure. Also, descriptions of well-known functions and constructions are omitted in the following description for clarity and conciseness.

The embodiments of the present disclosure and features thereof may be combined with each other as long as they are not contradictory.

As used herein, the term "and/or" includes any and all combinations of one or more of the associated listed items.

The terminology used herein is for the purpose of describing specific embodiments only and is not intended to limit the present disclosure. As used herein, the singular forms "a", "an" and "the" are intended to include the plural forms as well, unless the context clearly indicates otherwise. It will be further understood that as used herein, the terms "comprise" and/or "consist of . . . " specify the presence of stated features, integers, operations, operations, elements, and/or components, but do not preclude the presence or addition of one or more other features, integers, operations, operations, elements, components, and/or groups thereof. The terms "connected" or "coupled" and the like are not restricted to physical or mechanical connections, but may include electrical connections, whether direct or indirect.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

In related art, an efficient time-frequency transform device is typically implemented by an application-specific integrated circuit (ASIC), and each time-frequency transform device can implement only a fixed time-frequency transform algorithm, such as a time-frequency transform device capable of implementing DCT or a time-frequency transform device capable of implementing FFT. In addition, there are many limitations to the ASIC implementing the time-frequency transform. For example, data input to the ASIC must be $n^{th}$ power of 2 or a product of a prime and $n^{th}$ power of 2. Therefore, the time-frequency transform in the related art has poor flexibility.

In view of this, an embodiment of the present disclosure provides a signal processing method based on a many-core chip. The method may be applied to an electronic device (e.g., a compiler) external to the many-core chip, or a part of processing cores or a dedicated hardware module in the many-core chip, which is not particularly limited in the embodiments of the present disclosure.

FIG. 1 is a flowchart of a signal processing method based on a many-core chip according to an embodiment of the present disclosure. Referring to FIG. 1, the method includes the following operations S100 to S300.

At operation S100, determine, according to a time domain signal to be processed and a time-frequency transform type of the time domain signal, a transform kernel matrix of the time domain signal.

At operation S200, map the transform kernel matrix to a plurality of processing cores of the many-core chip.

At operation S300, map the time domain signal to the plurality of processing cores so that the plurality of processing cores determine, according to the transform kernel matrix and the time domain signal, a frequency domain signal corresponding to the time domain signal.

The embodiment of the present disclosure intends to provide a scheme for implementing time-frequency transform based on a many-core chip. The many-core chip simulates a neural network of a human brain and can realize some functions of the human brain. The many-core chip is not particularly limited in the implementations of the present disclosure. For example, the many-core chip may be composed of a single chip; or the many-core chip may be composed of a plurality of sub-chips, where each sub-chip has a plurality of computing units, and the smallest computing unit that can be independently scheduled and has complete computing power in each sub-chip is called a core or processing core. In the many-core chip, a plurality of cores work jointly, and each core can run program instructions independently, so that the running speed of a program is accelerated due to the parallel computing capability, and a multi-task processing capability is provided.

In some embodiments, the time domain signal to be processed may be, for example, a sampled pulse signal, an event signal captured by an event camera, or a voice signal captured by an audio acquisition device, or the like, and which is not particularly limited in the present disclosure.

In some embodiments, the time domain signal may be represented by a vector of a certain length. In operation S100 of the embodiment of the present disclosure, a transform kernel matrix of the time domain signal may be determined according to the vector length of the time domain signal and the corresponding time-frequency transform type.

In the embodiments of the present disclosure, the type of the time-frequency transform is not particularly limited. For example, the time-frequency transform type may include any one of DFT, DCT, FFT or CZT. That is, the many-core chip in the embodiments of the present disclosure can implement various time-frequency transform types. Different time-frequency transform types correspond to different transform kernel matrices. In the embodiments of the present disclosure, the many-core chip implements reconfiguration of the time-frequency transform, that is, by determining transform kernel matrices of different time-frequency transform types and mapping the transform kernel matrices to corresponding processing cores, corresponding time-frequency transform types can be implemented.

In operation S200 of the embodiment of the present disclosure, mapping the transform kernel matrix to a plurality of processing cores of the many-core chip means configuring the transform kernel matrix as a weight parameter in local storages of a plurality of processing cores. The transform kernel matrix may be obtained by dynamic computation or statically stored, or may be obtained through computation based on statically stored values. This is not particularly limited in the embodiments of the present disclosure.

In operation S300 of the embodiment of the present disclosure, mapping the time domain signal to the plurality of processing cores means inputting the time domain signal into input buffers of the plurality of processing cores. In an embodiment of the present disclosure, the time domain signal is stored as a one-dimensional vector. The plurality of processing cores can calculate and obtain a frequency domain signal corresponding to the time domain signal according to the transform kernel matrix and the one-dimensional vector.

It should be noted that, in the embodiment of the present disclosure, in operation S200, all transform kernel matrices may be mapped into a plurality of processing cores, or a transform kernel matrix corresponding to a target frequency range may be mapped into a plurality of processing cores. This is not particularly limited in the embodiments of the present disclosure. In a scenario in which the transform kernel matrix corresponding to the target frequency range is mapped into a plurality of processing cores, time-frequency transform can be performed on the target frequency range through operations S100 to S200, so as to obtain a frequency domain signal corresponding to the target frequency range.

According to the signal processing method provided in the embodiments of the present disclosure, the transform kernel matrix is determined according to a time domain signal and a time-frequency transform type, and by configuring the transform kernel matrix into a plurality of processing cores of a many-core chip and inputting the time domain signal into the plurality of processing cores of the many-core chip, the many-core chip can determine a frequency domain signal according to the time domain signal and the transform kernel matrix, and the time-frequency transform type includes, but is not limited to, DFT, DCT, FFT and CZT, thereby realizing various types of time-frequency transform of the many-core chip. Further, the plurality of processing cores configured into the many-core chip may form a part of the transform kernel matrix corresponding to any interval, and the many-core chip can perform time-frequency transform for any interval, so that the computation amount can be remarkably saved, and the time-frequency transform efficiency can be improved.

In the embodiments of the present disclosure, the frequency domain signal may be represented by a complex number. For example, the frequency domain signal $X_k=X_{k,R}+jX_{k,I}$, $k\in[0, N-1]$, where N is an integer greater than 1, i.e., the frequency domain signal may be decomposed into a frequency domain real part vector and a frequency domain imaginary part vector. As an alternative implementation, when the frequency domain signal corresponding to the time domain signal is determined through time-frequency transform, the frequency domain real part vector and the frequency domain imaginary part vector corresponding to the frequency domain signal are respectively determined, and finally, the frequency domain signal corresponding to the time domain signal is obtained. In an embodiment of the present disclosure, the many-core chip includes a plurality of processing cores that can be combined into a processing core group for determining the frequency domain real part vector and a processing core group for determining the frequency domain imaginary part vector.

Figure 2:
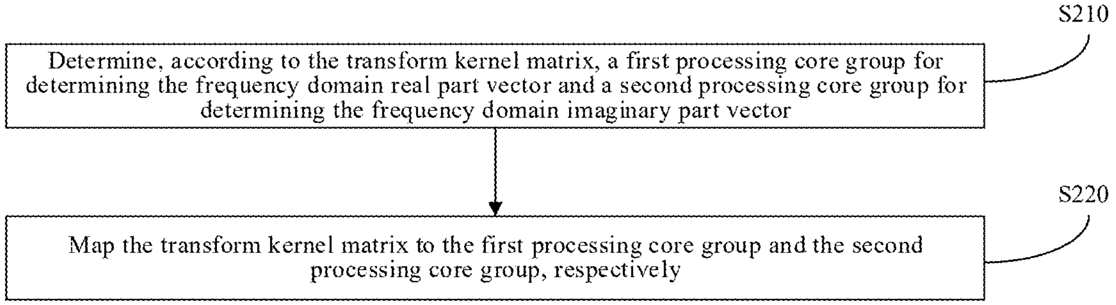
FIG. 2 is a flowchart of some operations in a signal processing method based on a many-core chip according to an embodiment of the present disclosure.

FIG. 2 is a flowchart of some operations in a signal processing method based on a many-core chip according to an embodiment of the present disclosure. In some embodiments, the frequency domain signal includes a frequency domain real part vector and a frequency domain imaginary part vector. Referring to FIG. 2, operation S200 includes the following operations S210 to S220.

At operation S210, determine, according to the transform kernel matrix, a first processing core group for determining the frequency domain real part vector and a second processing core group for determining the frequency domain imaginary part vector, where the first processing core group includes at least one processing core, and the second processing core group includes at least one processing core.

At operation S220, map the transform kernel matrix to the first processing core group and the second processing core group, respectively.

In other words, the computation amount desired for time-frequency transform may be determined according to a size of the transform kernel matrix. According to a preset limiting factor, such as at least one of the local storage size or processing capacity of a single processing core, or requirement on operating rate of the time-frequency transform, or the like, the number of processing cores desired for the time-frequency transform is determined. The processing core groups are divided according to the number of processing cores, to obtain the first processing core group for determining the frequency domain real part vector and the second processing core group for determining the frequency domain imaginary part vector. Further, in operation S220, the transform kernel matrix is mapped to the first processing core group and the second processing core group respectively for corresponding processing.

It should be noted that, after determining the first processing core group and the second processing core group and mapping the transform kernel matrix to the first processing core group and the second processing core group respectively through operations S210 to S220, operation S300 includes: mapping the time domain signal to the first processing core group and the second processing core group, respectively.

In an embodiment of the present disclosure, the first processing core group and the second processing core group may run in parallel, the plurality of processing cores in the first processing core group may run in parallel, and the plurality of processing cores in the second processing core group may run in parallel, so that the massive parallel computing capability of the many-core chip can be exerted, and efficient time-frequency transform can be implemented.

In an embodiment of the present disclosure, the time domain signal may be represented by a complex number. For example, the time domain signal $x_n = x_{n,R} + jx_{n,I}$, $n \in [0, N-1]$. An element in the transform kernel matrix may be referred to as a transform kernel, which may also be represented by a complex number. For example, the transform kernel $$W^{nk} = W_R^{nk} + jW_I^{nk}.$$

In an embodiment of the present disclosure, the real part $X_{k,R}$ of the frequency domain signal $X_k$, the time domain signal $x_n$, and the transform kernel $W^{nk}$ satisfy equation (1):

$$X_{k,R} = \sum_{n=0}^{N-1} \left( x_{n,R} W_R^{nk} - x_{n,I} W_I^{nk} \right) \tag{1}$$

The imaginary part $X_{k,I}$ of the frequency domain signal $X_k$, the time domain signal $x_n$, and the transform kernel $W^{nk}$ satisfy equation (2):

$$X_{k,I} = \sum_{n=0}^{N-1} \left( x_{n,I} W_R^{nk} + x_{n,R} W_I^{nk} \right) \tag{2}$$

In an embodiment of the present disclosure, the frequency domain signal is decomposed into the frequency domain real part vector and the frequency domain imaginary part vector, the transform kernel matrix is decomposed into the transform kernel real part matrix and the transform kernel imaginary part matrix, and the time domain signal is decomposed into the time domain real part vector and the time domain imaginary part vector. It can be obtained from equation (1) that the frequency domain real part vector=the time domain real part vector×the transform kernel real part matrix−the time domain imaginary part vector×the transform kernel imaginary part matrix. It can be obtained from equation (2) that the frequency domain imaginary part vector=the time domain imaginary part vector×the transform kernel real part matrix+the time domain real part vector×the transform kernel imaginary part matrix.

Figure 3:
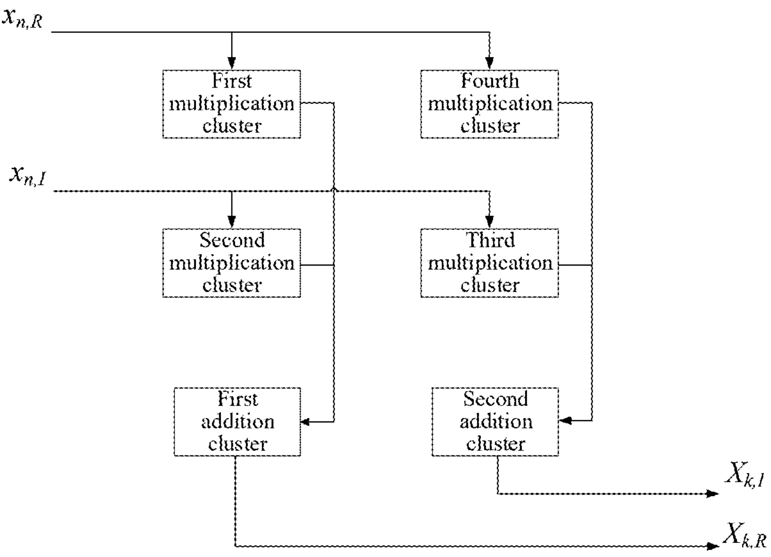
FIG. 3 is a schematic diagram showing time-frequency transform implemented by a many-core chip according to an embodiment of the present disclosure.

FIG. 3 is a schematic diagram showing time-frequency transform implemented by a many-core chip according to an embodiment of the present disclosure. As an alternative implementation, as shown in FIG. 3, in the first processing core group of the many-core chip, a first multiplication cluster is used to calculate the time domain real part vector× the transform kernel real part matrix, a second multiplication cluster is used to calculate the time domain imaginary part vector×the transform kernel imaginary part matrix, and a first addition cluster is used to perform point-to-point subtraction to calculate a difference between a product vector output from the first multiplication cluster and a product vector output from the second multiplication cluster, thereby obtaining the frequency domain real part vector. In the second processing core group of the many-core chip, a third multiplication cluster is used to calculate the time domain imaginary part vector×the transform kernel real part matrix, a fourth multiplication cluster is used to calculate the time domain real part vector×the transform kernel imaginary part matrix, and a second addition cluster is used to perform point-to-point addition to calculate a sum of a product vector output from the third multiplication cluster and a product vector output from the fourth multiplication cluster, thereby obtaining the frequency domain imaginary part vector.

As shown in FIG. 3, the transform kernel real part matrix is configured to processing cores in the first multiplication cluster and the third multiplication cluster, respectively, and the transform kernel imaginary part matrix is configured to processing cores in the second multiplication cluster and the fourth multiplication cluster, respectively. Accordingly, the time domain real part vector is input into the first multiplication cluster and the fourth multiplication cluster, respectively, and the time domain imaginary part vector is input into the second multiplication cluster and the third multiplication cluster, respectively.

It should be noted that, in the embodiment of the present disclosure, a first product obtained after the first multiplication cluster is used to calculate the time domain real part vector×the transform kernel real part matrix, and a second product obtained after the second multiplication cluster is used to calculate the time domain imaginary part vector×the transform kernel imaginary part matrix, are transmitted to a first addition cluster through a network on chip of the many-core chip. The first product and the second product are one-dimensional vectors. The first addition cluster can perform point-to-point subtraction to obtain the frequency domain real part vector. A third product obtained after the third multiplication cluster is used to calculate the time domain imaginary part vector×the transform kernel real part matrix, and a fourth product obtained after the fourth multiplication cluster is used to calculate the time domain real part vector×the transform kernel imaginary part matrix, are transmitted to a second addition cluster through the network on chip of the many-core chip. The third product and the fourth product are one-dimensional vectors. The second addition cluster can perform point-to-point addition to obtain the frequency domain imaginary part vector.

Figure 4:
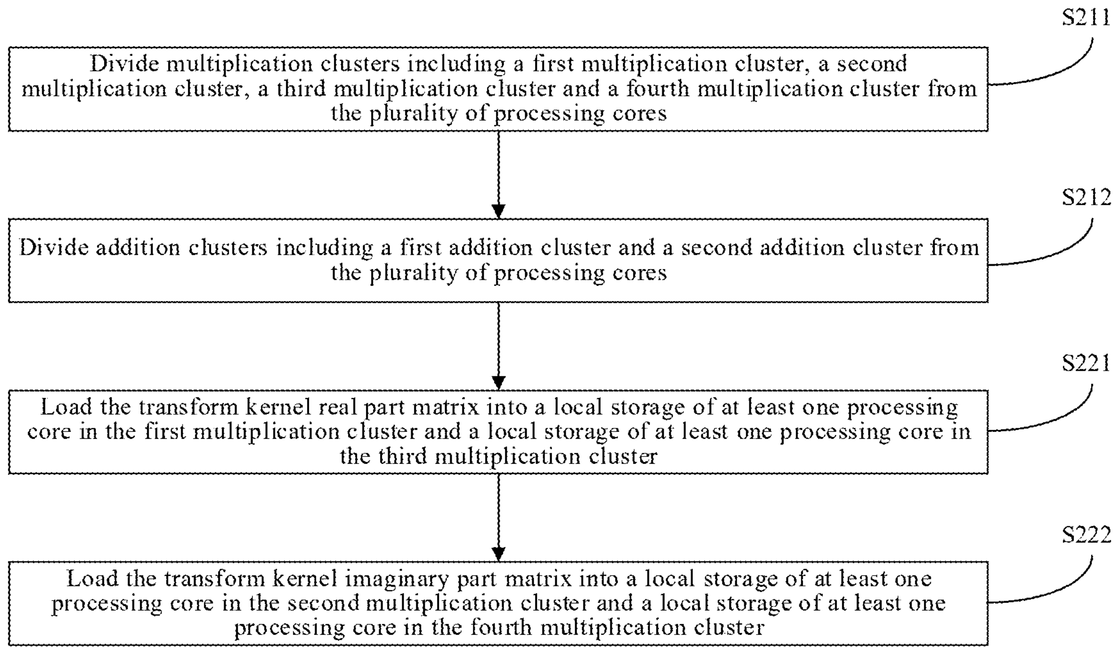
FIG. 4 is a flowchart of some operations in a signal processing method based on a many-core chip according to an embodiment of the present disclosure.

FIG. 4 is a flowchart of some operations in a signal processing method based on a many-core chip according to an embodiment of the present disclosure. Accordingly, in some embodiments, the transform kernel matrix includes a transform kernel real part matrix and a transform kernel imaginary part matrix. Referring to FIG. 4, operation S210 includes the following operations S211 to S212.

At operation S211, divide multiplication clusters including a first multiplication cluster, a second multiplication cluster, a third multiplication cluster and a fourth multiplication cluster from the plurality of processing cores, where the first multiplication cluster and the third multiplication cluster correspond to the transform kernel real part matrix, and the second multiplication cluster and the fourth multiplication cluster correspond to the transform kernel imaginary part matrix.

At operation S212, divide addition clusters including a first addition cluster and the second multiplication cluster, where the first addition cluster corresponds to the first multiplication cluster and the second multiplication cluster, and the second addition cluster corresponds to the third multiplication cluster and the fourth multiplication cluster.

The first processing core group includes the first multiplication cluster, the second multiplication cluster and the first addition cluster; the second processing core group includes the third multiplication cluster, the fourth multiplication cluster and the second addition cluster; and each of the multiplication clusters includes at least one processing core, and each of the addition clusters includes at least one processing core.

How the transform kernel matrix is decomposed into the transform kernel real part matrix and the transform kernel imaginary part matrix is not particularly limited in the embodiments of the present disclosure. For example, for DFT (or FFT), the frequency domain signal and the time domain signal satisfy equation (3):

$$X_k = \sum_{n=0}^{N-1}\left(x_n e^{-j\frac{2\pi}{N}nk}\right) = \sum_{n=0}^{N-1}\left(x_n W^{nk}\right) \tag{3}$$

Therefore, the transform kernel real part matrix may be expressed by equation (4):

$$W_R^{nk} = RE\left(e^{-j\frac{2\pi}{N}nk}\right) = \cos\left(-\frac{2\pi}{N}nk\right) \tag{4}$$

The transform kernel imaginary part matrix may be expressed by equation (5):

$$W_I^{nk} = IM\left(e^{-j\frac{2\pi}{N}nk}\right) = \sin\left(-\frac{2\pi}{N}nk\right) \tag{5}$$

For example, for DCT-II, the frequency domain signal and the time domain signal satisfy equation (6):

$$X_k = \sum_{n=0}^{N-1} x_n \cos\left[\frac{\pi}{N}k\left(n + \frac{1}{2}\right)\right] \tag{6}$$

The transform kernel real part matrix may be expressed by equation (7):

$$W_R^{nk} = W^{nk} = \sum_{n=0}^{N-1} x_n \cos\left[\frac{\pi}{N}k\left(n + \frac{1}{2}\right)\right] \tag{7}$$

For example, for CZT, the frequency domain signal and the time domain signal satisfy equation (8):

$$X_k = \sum_{n=0}^{N-1}\left(x_n e^{-j\frac{2\pi}{N}nk}\right) = \sum_{n=0}^{N-1} x_n\left(AW^{-k}\right)^{-n} \tag{8}$$

The transform kernel matrix may be expressed by equation (9):

$$W^{nk}=(AW^{-k})^{-n} \tag{9}$$

In some embodiments, the computation amount desired for the multiplication, addition (subtraction) in the time-frequency transform may be determined according to sizes of the transform kernel real part matrix and the transform kernel imaginary part matrix. According to a preset limiting factor, such as at least one of the local storage size or processing capacity of a single processing core, or requirement on operating rate of the time-frequency transform, or the like, the number of processing cores desired for each of the multiplication clusters or the addition clusters is determined; and according to the number of processing cores desired for each of the multiplication clusters or the addition clusters, the multiplication clusters and the addition clusters are divided from the plurality of processing cores to obtain the first to fourth multiplication clusters and the first and second addition clusters. Thereby, the division of respective processing core clusters is completed.

Accordingly, in some embodiments, referring to FIG. 4, operation S220 includes the following operations S221 to S222.

At operation S221, load the transform kernel real part matrix into a local storage of at least one processing core in the first multiplication cluster and a local storage of at least one processing core in the third multiplication cluster.

At operation S222, load the transform kernel imaginary part matrix into a local storage of at least one processing core in the second multiplication cluster and a local storage of at least one processing core in the fourth multiplication cluster.

In some embodiments, when the division of the processing core clusters is completed, corresponding data may be loaded into the respective multiplication clusters and addition clusters. In other words, the transform kernel real part matrix is loaded into local storages of processing cores in the first multiplication cluster and local storages of processing cores in the third multiplication cluster; and the transform kernel imaginary part matrix is loaded into local storages of processing cores in the second multiplication cluster and local storages of processing cores in the fourth multiplication cluster, so as to facilitate corresponding processing by the respective processing cores.

Figure 5:
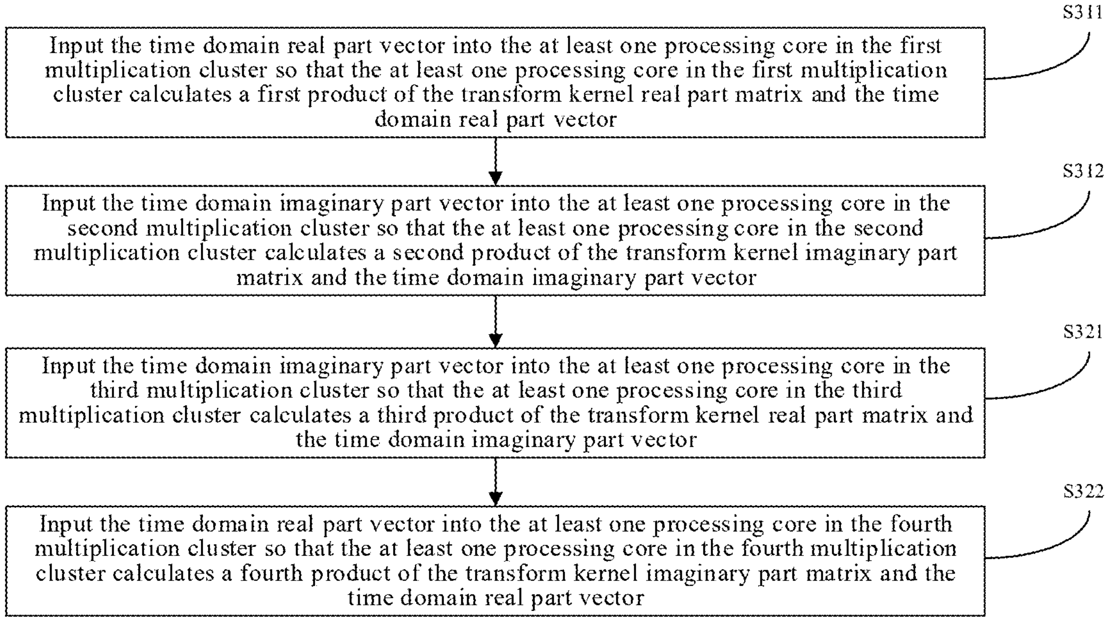
FIG. 5 is a flowchart of some operations in a signal processing method based on a many-core chip according to an embodiment of the present disclosure.

FIG. 5 is a flowchart of some operations in a signal processing method based on a many-core chip according to an embodiment of the present disclosure.

Accordingly, in some embodiments, the time domain signal includes a time domain real part vector and a time domain imaginary part vector. Referring to FIG. 5, operation S300 includes the following operations S311 to S322.

At operation S311, input the time domain real part vector into the at least one processing core in the first multiplication cluster so that the at least one processing core in the first multiplication cluster calculates a first product of the transform kernel real part matrix and the time domain real part vector.

At operation S312, input the time domain imaginary part vector into the at least one processing core in the second multiplication cluster so that the at least one processing core in the second multiplication cluster calculates a second product of the transform kernel imaginary part matrix and the time domain imaginary part vector.

The first product and the second product are transmitted to the first addition cluster so that the first addition cluster determines the frequency domain real part vector from the first product and the second product.

At operation S321, input the time domain imaginary part vector into the at least one processing core in the third multiplication cluster so that the at least one processing core in the third multiplication cluster calculates a third product of the transform kernel real part matrix and the time domain imaginary part vector.

At operation S322, input the time domain real part vector into the at least one processing core in the fourth multiplication cluster so that the at least one processing core in the fourth multiplication cluster calculates a fourth product of the transform kernel imaginary part matrix and the time domain real part vector.

The third product and the fourth product are transmitted to the second addition cluster so that the second addition cluster determines the frequency domain imaginary part vector from the third product and the fourth product.

In an embodiment of the present disclosure, addresses of the processing cores corresponding to the time domain real part vector and the time domain imaginary part vector may be determined in an on-chip manner, and then the time domain real part vector and the time domain imaginary part vector are routed to the corresponding processing cores through the network on chip. Alternatively, addresses of the processing cores corresponding to the time domain real part vector and the time domain imaginary part vector may be determined in an off-chip manner, and upon receiving the time domain signal, the many-core chip routes, according to the corresponding addresses, the time domain real part vector and the time domain imaginary part vector to the corresponding processing cores through the network on chip.

Through the above operations, the time-frequency transform process for the time domain signal can be implemented. In the process, the operations S311, S312, S321, S322 can be processed in parallel; and the processing cores of the multiplication clusters and the addition clusters can also perform parallel processing, which notably improves the processing efficiency of time-frequency transform.

Figure 6:
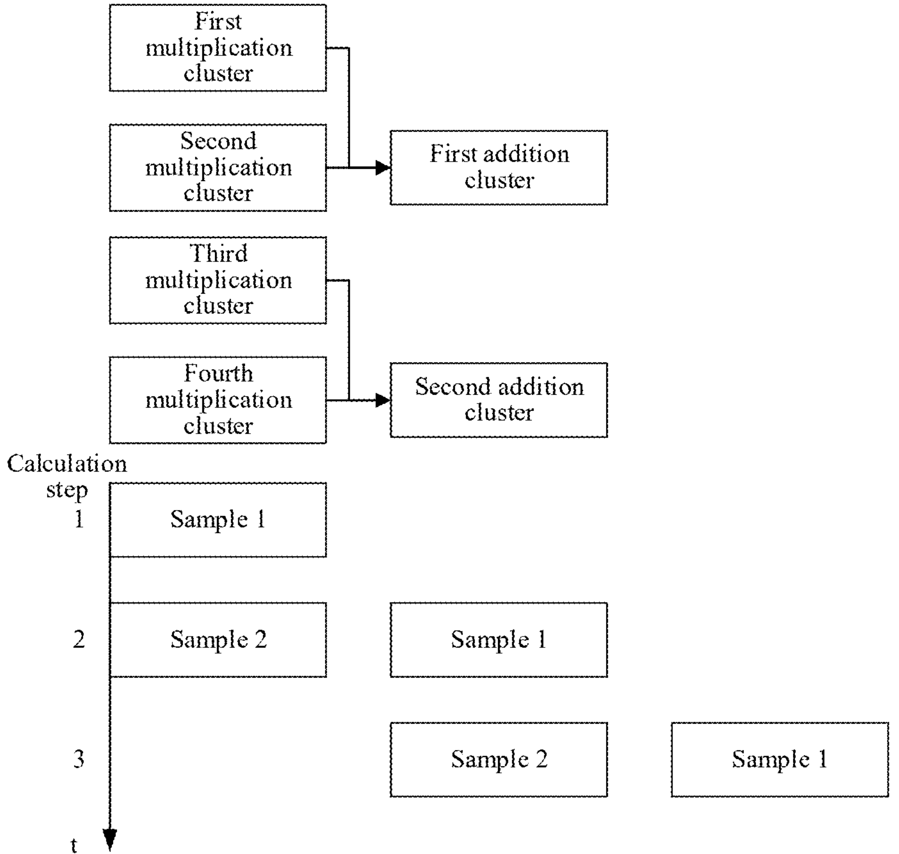
FIG. 6 is a schematic diagram showing flow operations in time-frequency transform according to an embodiment of the present disclosure.

FIG. 6 is a schematic diagram showing flow operations in time-frequency transform according to an embodiment of the present disclosure.

In an embodiment of the present disclosure, the many-core chip is capable of streamlined operation. As shown in FIG. 6, the streamlined operation refers to that after the first multiplication cluster outputs the first product to the first addition cluster, the first multiplication cluster may receive a new time domain real part vector, and continue the vector-matrix multiplication between the transform kernel real part matrix and the time domain real part vector; after the second multiplication cluster outputs the second product to the first addition cluster, the second multiplication cluster may receive a new time domain imaginary part vector, and continue the vector-matrix multiplication between the transform kernel imaginary part matrix and the time domain imaginary part vector; after the third multiplication cluster outputs the third product to the second addition cluster, the third multiplication cluster may receive a new time domain imaginary part vector, and continue the vector-matrix multiplication between the transform kernel real part matrix and the time domain imaginary part vector; and after the fourth multiplication cluster outputs the fourth product to the second addition cluster, the fourth multiplication cluster may receive a new time domain real part vector, and continue the vector-matrix multiplication between the transform kernel imaginary part matrix and the time domain real part vector. In FIG. 6, sample 1 corresponds to the time domain real part vector or the time domain imaginary part vector, and sample 2 corresponds to the time domain imaginary part vector or the time domain real part vector, which are used to illustrate the flow of data in each calculation step.

In this manner, the samples are processed in respective calculation steps in sequence, so that streamlined operation of the time-frequency transform is implemented, and thus the processing efficiency of the time-frequency transform on a plurality of time domain signals is improved.

Figure 7:
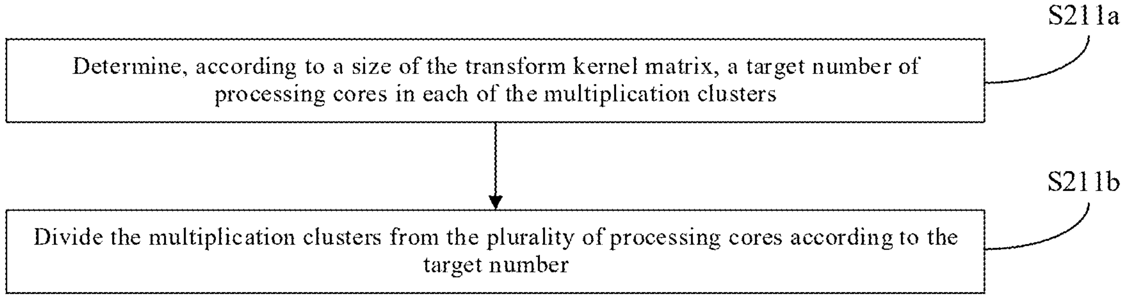
FIG. 7 is a flowchart of some operations in a signal processing method based on a many-core chip according to an embodiment of the present disclosure.

FIG. 7 is a flowchart of some operations in a signal processing method based on a many-core chip according to an embodiment of the present disclosure.

Accordingly, in some embodiments, referring to FIG. 7, operation S211 includes the following operations S211*a* to S211*b*.

At operation S211*a*, determine, according to a size of the transform kernel matrix, a target number of processing cores in each of the multiplication clusters.

At operation S211*b*, divide the multiplication clusters from the plurality of processing cores according to the target number.

In an embodiment of the present disclosure, according to the transform kernel matrix and at least one of the local storage size or processing capacity of a single processing core, or requirement on operating rate of the time-frequency transform, or the like, the number of processing cores in each of the multiplication clusters and the number of processing cores in each of the addition clusters can be determined. This is not particularly limited in the embodiments of the present disclosure. For example, when a single processing core cannot complete the vector-matrix multiplication corresponding to the time domain signal and the transform kernel matrix, the multiplication cluster includes a plurality of processing cores; and when a single processing core can complete the vector-matrix multiplication corresponding to the time domain signal and the transform kernel matrix, the multiplication cluster may include one or more processing cores.

In some embodiments, before mapping the transform kernel matrix to the first processing core group and the second processing core group, respectively, the signal processing method further includes: dividing the transform kernel real part matrix into a plurality of transform kernel real part sub-matrices; and dividing the transform kernel imaginary part matrix into a plurality of transform kernel imaginary part sub-matrices.

In an embodiment of the present disclosure, when the multiplication cluster includes a plurality of processing cores, the transform kernel real part matrix is desired to be divided into a plurality of transform kernel real part sub-matrices, where in the multiplication cluster, each of the transform kernel real part sub-matrices corresponds to one of the processing cores; and the transform kernel imaginary part matrix is divided into a plurality of transform kernel imaginary part sub-matrices, where in the multiplication cluster, each of the transform kernel imaginary part sub-matrices corresponds to one of the processing cores.

FIG. 8 is a schematic diagram of an implementation of multiplication clusters according to an embodiment of the present disclosure, i.e., a case where the multiplication cluster includes a plurality of processing cores. As shown in FIG. 8, the multiplication cluster includes A×B processing cores (the dotted boxes indicate the processing cores), which form an A×B array. The transform kernel matrix is divided into A×B sub-matrices, which form an A×B array, where the A×B sub-matrices are in one-to-one correspondence with the A×B processing cores. The time domain vector is divided/partitioned into A sub-vectors, each of which is multicasted to the array shown in FIG. 8. The respective processing cores of the same row in the array receive the same sub-vector. In the same processing core group, the calculation results of the processing cores in different multiplication clusters are output from the plurality of processing cores of the multiplication clusters, and point-to-point addition is performed on the addition clusters by columns.

It should be noted that, in the embodiment of the present disclosure, corresponding to dividing the transform kernel real part matrix into a plurality of transform kernel real part sub-matrices and dividing the transform kernel imaginary part matrix into a plurality of transform kernel imaginary part sub-matrices, it is also desired to divide the time domain real part vector into a plurality of time domain real part sub-vectors, and divide the time domain imaginary part vector into a plurality of time domain imaginary part sub-vectors.

Accordingly, in some embodiments, the time domain signal includes the time domain real part vector and the time domain imaginary part vector; and before mapping the time domain signal to the plurality of processing cores, the signal processing method further includes: dividing the time domain real part vector into a plurality of time domain real part sub-vectors; and dividing the time domain imaginary part vector into a plurality of time domain imaginary part sub-vectors.

In some embodiments, the dividing manner of the time domain real part vector and the time domain imaginary part vector may correspond to the dividing manner of the transform kernel real part matrix and the transform kernel imaginary part matrix. For example, if the transform kernel real part matrix and the transform kernel imaginary part matrix are divided into A×B sub-matrices, respectively, the time domain real part vector and the time domain imaginary part vector are divided into A sub-vectors, respectively. The particular dividing manner is not limited in the present disclosure.

Accordingly, in some embodiments, loading the transform kernel real part matrix into the local storage of the at least one processing core in the first multiplication cluster and the local storage of the at least one processing core in the third multiplication cluster includes: loading the plurality of transform kernel real part sub-matrices into local storages of a plurality of processing cores in the first multiplication cluster, where each of the plurality of processing cores in the first multiplication cluster corresponds to one of the transform kernel real part sub-matrices; and loading the plurality of transform kernel real part sub-matrices into local storages of a plurality of processing cores in the third multiplication cluster, where each of the plurality of processing cores in the third multiplication cluster corresponds to one of the transform kernel real part sub-matrices; and loading the transform kernel imaginary part matrix into the local storage of the at least one processing core in the second multiplication cluster and the local storage of the at least one processing core in the fourth multiplication cluster includes: loading the plurality of transform kernel imaginary part sub-matrices into local storages of a plurality of processing cores in the second multiplication cluster, where each of the plurality of processing cores in the second multiplication cluster corresponds to one of the transform kernel imaginary part sub-matrices; and loading the plurality of transform kernel imaginary part sub-matrices into local storages of a plurality of processing cores in the fourth multiplication cluster, where each of the plurality of processing cores in the fourth multiplication cluster corresponds to one of the transform kernel imaginary part sub-matrices.

In this way, the loading process of the sub-matrices of the real part and the imaginary part of each transform kernel can be implemented.

In some embodiments, mapping the time domain signal to the plurality of processing cores includes: inputting, for each multiplication cluster according to one of a correspondence relationship of the plurality of time domain real part sub-vectors and the plurality of transform kernel real part sub-matrices, a correspondence relationship of the plurality of time domain real part sub-vectors and the plurality of transform kernel imaginary part sub-matrices, a correspondence relationship of the plurality of time domain imaginary part sub-vectors and the plurality of transform kernel real part sub-matrices, or a correspondence relationship of the plurality of time domain imaginary part sub-vectors and the plurality of transform kernel imaginary part sub-matrices, the plurality of time domain real part sub-vectors or the plurality of time domain imaginary part sub-vectors into the plurality of processing cores in the multiplication cluster.

In the embodiment of the present disclosure, the transform kernel matrix may be obtained by dynamic computation or statically stored, or may be obtained through computation based on statically stored values. This is not particularly limited in the embodiments of the present disclosure. It should be noted that the transform kernel matrix changes with the time-frequency transform type.

FIG. 9 is a flowchart of some operations in a signal processing method based on a many-core chip according to an embodiment of the present disclosure.

Accordingly, in some embodiments, referring to FIG. 9, operation S100 includes the following operation S110.

At operation S110, determine the transform kernel matrix according to a vector length of the time domain signal, the time-frequency transform type and a statically stored preset value.

In some embodiments, the vector length of the time domain signal may be set to N, where N is an integer greater than 1. The respective elements (i.e., the transform kernels) in the transform kernel matrix may be calculated based on the vector length N, the time-frequency transform type (DFT, DCT, FFT, or CZT, etc.), and the statically stored preset value.

The statically stored value used in computation of the transform kernel matrix is not particularly limited in the embodiments of the present disclosure. For example, the statically stored value may be a Taylor series, and the transform kernel matrix is determined by computing a Taylor expansion; or the statically stored value may be a rotation factor, from which the transform kernel matrix can be computed; or table 1 may be stored, and the transform kernel matrix is determined from the data stored in table 1.

TABLE 1

| | | | | |
|---|---|---|---|---|
| $W^0$ | $W^0$ | $W^0$ | $W^0$ | $W^0$ |
| $W^0$ | $W^1$ | $W^2$ | $W^3$ | $W^{N-1}$ |
| $W^0$ | $W^2$ | $W^4$ | $W^6$ | $W^{2(N-1)}$ |
| $W^0$ | $W^3$ | $W^6$ | $W^9$ | $W^{3(N-1)}$ |
| | ... | ... | ... | ... |
| $W^0$ | $W^{N-1}$ | $W^{2(N-1)}$ | $W^{3(N-1)}$ | $W^{(N-1)(N-1)}$ |

In an embodiment of the present disclosure, all transform kernel matrices may be mapped into a plurality of processing cores, or a transform kernel matrix corresponding to a target frequency range may be mapped into a plurality of processing cores. This is not particularly limited in the embodiments of the present disclosure. In a scenario in which the transform kernel matrices corresponding to the target frequency range is mapped into a plurality of processing cores, time-frequency transform can be performed on the target frequency range, so as to obtain a frequency domain signal corresponding to the target frequency range.

FIG. 10 is a flowchart of some operations in a signal processing method based on a many-core chip according to an embodiment of the present disclosure.

Accordingly, in some embodiments, referring to FIG. 10, operation S100 includes the following operations S121 to S122.

At operation S121, determine a target frequency range to be transformed.

At operation S122, determine, according to a vector length of the time domain signal and the time-frequency transform type, the transform kernel matrix corresponding to the target frequency range.

For example, for a time domain signal of a vector length N, the corresponding frequency domain signal may also be represented by a vector of a length N, i.e., the frequency domain signal $X_k=X_{k,R}+jX_{k,I}$, $k\in[0, N-1]$. If there is a frequency range of interest, a target frequency range to be transformed may be set, e.g., [k1, k2], where $0\leq k1<k2\leq N-1$.

In some embodiments, a complete transform kernel matrix can be determined according to the vector length N of the time domain signal and the time-frequency transform type; and according to the target frequency range, a transform kernel matrix corresponding to the target frequency range can be determined from the complete transform kernel matrix. Further, in operations S200 and S300, the transform kernel matrix corresponding to the target frequency range and the time domain signal may be mapped to the plurality of processing cores, respectively, so that the processing cores perform time-frequency transform to obtain a frequency domain signal for the target frequency range.

In this way, the target frequency range of interest can be subjected to time-frequency transform, so that the data processing amount in the time-frequency transform is reduced, and the processing efficiency is improved.

The embodiments of the present disclosure may be also applied to window function filtering, including low-pass filtering and band-pass filtering.

Figure 11:
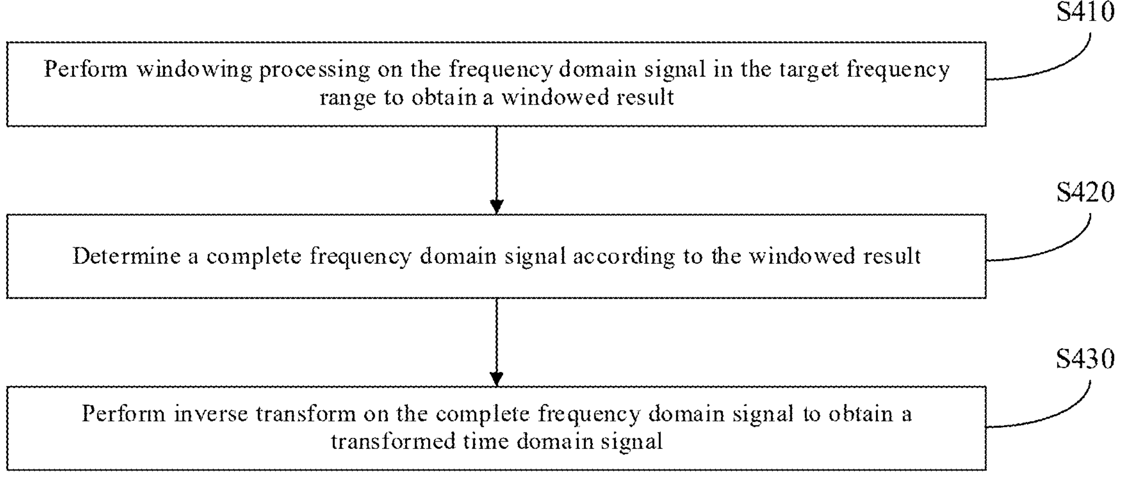
FIG. 11 is a flowchart of some operations in a signal processing method based on a many-core chip according to an embodiment of the present disclosure.

FIG. 11 is a flowchart of some operations in a signal processing method based on a many-core chip according to an embodiment of the present disclosure.

Under a condition that time-frequency transform is performed on the target frequency range, the processing cores perform the time-frequency transform to obtain a frequency domain signal corresponding to the time domain signal, which is the frequency domain signal for the target frequency range. Accordingly, in some embodiments, referring to FIG. 11, the signal processing method further includes the following operations S410 to S430.

At operation S410, perform windowing processing on the frequency domain signal for the target frequency range to obtain a windowed result.

At operation S420, determine a complete frequency domain signal according to the windowed result.

At operation S430, perform inverse transform on the complete frequency domain signal to obtain a transformed time domain signal.

In an embodiment of the present disclosure, for a frequency domain signal in the target frequency range [k1, k2], windowing processing, i.e., a dot product operation, may be performed on [k1, k2] to obtain a windowed result. After the windowed result is obtained, zero padding is performed on a left side and a right side of the target frequency range [k1, k2] to obtain a complete frequency domain signal, i.e., the frequency domain signal for the [0, N−1] frequency range.

In some embodiments, the complete frequency domain signal may be inversely transformed in operation S430 to obtain the transformed time domain signal, and the specific processing manner of the inverse transform is not limited in the present disclosure.

It should be noted that, in the embodiment of the present disclosure, the frequency domain signal corresponding to the target frequency range is calculated through operations S100 to S300, and the complete frequency domain signal is obtained through operations S410 to S420, which is equivalent to a manner of calculating the complete frequency domain signal first and then windowing in some related art. The embodiment of the present disclosure can obviously save the computation amount.

Figure 12:
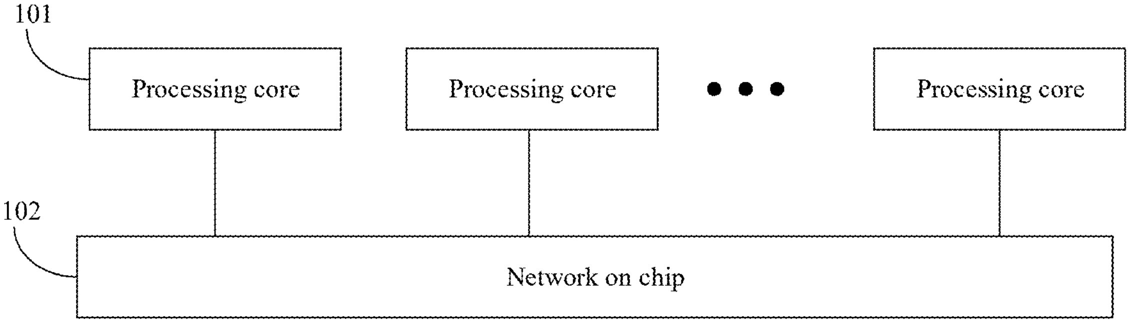
FIG. 12 is a block diagram showing components of an electronic device according to an embodiment of the present disclosure.

FIG. 12 is a block diagram showing components of an electronic device according to an embodiment of the present disclosure.

In the second aspect, referring to FIG. 12, an embodiment of the present disclosure provides an electronic device, including a plurality of processing cores 101 and a network on chip 102. The plurality of processing cores 101 are connected to the network on chip 102, respectively, and the network on chip 102 is configured for interacting data among the plurality of processing cores and external data.

One or more of the processing cores 101 have stored thereon one or more instructions which, when executed by the one or more processing cores 101, enable the one or more of processing cores 101 to implement the signal processing method as described above.

In some embodiments, the electronic device is a many-core chip.

In a third aspect, an embodiment of the present disclosure provides a computer-readable medium storing a computer program thereon, where the computer program, when executed by a processing core, causes the signal processing method as described above to be implemented.

In a fourth aspect, an embodiment of the present disclosure further provides a computer program product including computer-readable codes or a nonvolatile computer-readable storage medium having computer-readable codes stored thereon, where the computer-readable codes, when executed on a processor of an electronic device, enable the processor of the electronic device to implement the signal processing method as described above.

Those of ordinary skill in the art will appreciate that all or some operations of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). The term computer storage medium includes volatile and nonvolatile, removable and non-removable media implemented in any method or technology for storage of information such as computer-readable instructions, data structures, program modules or other data, as is well known to those of ordinary skill in the art. The computer storage medium includes, but is not limited to, an RAM, an ROM, an EEPROM, a flash or any other memory technology, a CD-ROM, a digital versatile disc (DVD) or any other optical disc storage, a magnetic cartridge, a magnetic tape, a magnetic disk storage or any other magnetic storage device, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed exemplary embodiments, and although specific terms are employed, they are used and should be interpreted merely in a generic and descriptive sense, not for purposes of limitation. In some instances, as would be apparent to one skilled in the art, features, characteristics and/or elements described in connection with a particular embodiment may be used alone or in combination with features, characteristics and/or elements described in connection with another embodiment, unless expressly stated otherwise. It will, therefore, be understood by those skilled in the art that various changes in form and details may be made therein without departing from the scope of the present disclosure as set forth in the appended claims.

What is claimed is:

1. A signal processing method based on a many-core chip, comprising:

determining, according to a time domain signal to be processed and a time-frequency transform type of the time domain signal, a transform kernel matrix of the time domain signal;

mapping the transform kernel matrix to a plurality of processing cores of the many-core chip; and mapping the time domain signal to the plurality of processing cores so that the plurality of processing cores determine, according to the transform kernel matrix and the time domain signal, a frequency domain signal corresponding to the time domain signal, wherein the frequency domain signal comprises a frequency domain real part vector and a frequency domain imaginary part vector, and mapping the transform kernel matrix to the plurality of processing cores of the many-core chip comprises:

determining, according to the transform kernel matrix, a first processing core group for determining the frequency domain real part vector and a second processing core group for determining the frequency domain imaginary part vector, wherein the first processing core group comprises at least one processing core, and the second processing core group comprises at least one processing core; and mapping the transform kernel matrix to the first processing core group and the second processing core group, respectively, wherein the transform kernel matrix comprises a transform kernel real part matrix and a transform kernel imaginary part matrix, determining, according to the transform kernel matrix, the first processing core group for determining the frequency domain real part vector and the second processing core group for determining the frequency domain imaginary part vector comprises:

dividing multiplication clusters comprising a first multiplication cluster, a second multiplication cluster, a third multiplication cluster and a fourth multiplication cluster from the plurality of processing cores, wherein the first multiplication cluster and the third multiplication cluster correspond to the transform kernel real part matrix, and the second multiplication cluster and the fourth multiplication cluster correspond to the transform kernel imaginary part matrix;

dividing addition clusters comprising a first addition cluster and a second addition cluster from the plurality of processing cores, wherein the first addition cluster corresponds to the first multiplication cluster and the second multiplication cluster, and the second addition cluster corresponds to the third multiplication cluster and the fourth multiplication cluster, wherein each of the multiplication clusters comprises at least one processing core, and each of the addition clusters comprises at least one processing core, the first processing core group comprises the first multiplication cluster, the second multiplication cluster and the first addition cluster, and the second processing core group comprises the third multiplication cluster, the fourth multiplication cluster and the second addition cluster, mapping the transform kernel matrix to the first processing core group and the second processing core group, respectively comprises:

loading the transform kernel real part matrix into a local storage of at least one processing core in the first multiplication cluster and a local storage of at least one processing core in the third multiplication cluster; and loading the transform kernel imaginary part matrix into a local storage of at least one processing core in the second multiplication cluster and a local storage of at least one processing core in the fourth multiplication cluster, wherein the time domain signal comprises a time domain real part vector and a time domain imaginary part vector, mapping the time domain signal to the plurality of processing cores comprises:

inputting the time domain real part vector into the at least one processing core in the first multiplication cluster so that the at least one processing core in the first multiplication cluster calculates a first product of the transform kernel real part matrix and the time domain real part vector;

inputting the time domain imaginary part vector into the at least one processing core in the second multiplication cluster so that the at least one processing core in the second multiplication cluster calculates a second product of the transform kernel imaginary part matrix and the time domain imaginary part vector;

transmitting the first product and the second product to the first addition cluster so that the first addition cluster determines the frequency domain real part vector from the first product and the second product;

inputting the time domain imaginary part vector into the at least one processing core in the third multiplication cluster so that the at least one processing core in the third multiplication cluster calculates a third product of the transform kernel real part matrix and the time domain imaginary part vector;

inputting the time domain real part vector into the at least one processing core in the fourth multiplication cluster so that the at least one processing core in the fourth multiplication cluster calculates a fourth product of the transform kernel imaginary part matrix and the time domain real part vector; and transmitting the third product and the fourth product to the second addition cluster so that the second addition cluster determines the frequency domain imaginary part vector from the third product and the fourth product.

2. The signal processing method according to claim 1, wherein dividing the multiplication clusters from the plurality of processing cores comprises:

determining, according to a size of the transform kernel matrix, a target number of processing cores in each of the multiplication cluster; and dividing the multiplication clusters from the plurality of processing cores according to the target number.

3. The signal processing method according to claim 2, wherein before mapping the transform kernel matrix to the first processing core group and the second processing core group, respectively, the signal processing method further comprises:

dividing the transform kernel real part matrix into a plurality of transform kernel real part sub-matrices, and dividing the transform kernel imaginary part matrix into a plurality of transform kernel imaginary part sub-matrices, wherein the time domain signal comprises a time domain real part vector and a time domain imaginary part vector, and before mapping the time domain signal to the plurality of processing cores, the signal processing method further comprises:

dividing the time domain real part vector into a plurality of time domain real part sub-vectors, and dividing the time domain imaginary part vector into a plurality of time domain imaginary part sub-vectors.

4. The signal processing method according to claim 3, wherein loading the transform kernel real part matrix into the local storage of the at least one processing core in the first multiplication cluster and the local storage of the at least one processing core in the third multiplication cluster comprises:

loading the plurality of transform kernel real part sub-matrices into local storages of a plurality of processing cores in the first multiplication cluster, wherein each of the plurality of processing cores in the first multiplication cluster corresponds to one of the transform kernel real part sub-matrices;

loading the plurality of transform kernel real part sub-matrices into local storages of a plurality of processing cores in the third multiplication cluster, wherein each of the plurality of processing cores in the third multiplication cluster corresponds to one of the transform kernel real part sub-matrices, loading the transform kernel imaginary part matrix into the local storage of the at least one processing core in the second multiplication cluster and the local storage of the at least one processing core in the fourth multiplication cluster comprises:

loading the plurality of transform kernel imaginary part sub-matrices into local storages of a plurality of processing cores in the second multiplication cluster, wherein each of the plurality of processing cores in the second multiplication cluster corresponds to one of the transform kernel imaginary part sub-matrices; and loading the plurality of transform kernel imaginary part sub-matrices into local storages of a plurality of processing cores in the fourth multiplication cluster, wherein each of the plurality of processing cores in the fourth multiplication cluster corresponds to one of the transform kernel imaginary part sub-matrices.

5. The signal processing method according to claim 1, wherein before mapping the transform kernel matrix to the first processing core group and the second processing core group, respectively, the signal processing method further comprises:

dividing the transform kernel real part matrix into a plurality of transform kernel real part sub-matrices, and dividing the transform kernel imaginary part matrix into a plurality of transform kernel imaginary part sub-matrices, and before mapping the time domain signal to the plurality of processing cores, the signal processing method further comprises:

dividing the time domain real part vector into a plurality of time domain real part sub-vectors, and dividing the time domain imaginary part vector into a plurality of time domain imaginary part sub-vectors.

6. The signal processing method according to claim 5, wherein loading the transform kernel real part matrix into the local storage of the at least one processing core in the first multiplication cluster and the local storage of the at least one processing core in the third multiplication cluster comprises:

loading the plurality of transform kernel real part sub-matrices into local storages of a plurality of processing cores in the first multiplication cluster, wherein each of the plurality of processing cores in the first multiplication cluster corresponds to one of the transform kernel real part sub-matrices;

loading the plurality of transform kernel real part sub-matrices into local storages of a plurality of processing cores in the third multiplication cluster, wherein each of the plurality of processing cores in the third multiplication cluster corresponds to one of the transform kernel real part sub-matrices, loading the transform kernel imaginary part matrix into the local storage of the at least one processing core in the second multiplication cluster and the local storage of the at least one processing core in the fourth multiplication cluster comprises:

loading the plurality of transform kernel imaginary part sub-matrices into local storages of a plurality of processing cores in the second multiplication cluster, wherein each of the plurality of processing cores in the second multiplication cluster corresponds to one of the transform kernel imaginary part sub-matrices; and loading the plurality of transform kernel imaginary part sub-matrices into local storages of a plurality of processing cores in the fourth multiplication cluster, wherein each of the plurality of processing cores in the fourth multiplication cluster corresponds to one of the transform kernel imaginary part sub-matrices.

7. The signal processing method according to claim 1, wherein determining, according to the time domain signal to be processed and the time-frequency transform type of the time domain signal, the transform kernel matrix of the time domain signal comprises:

determining a target frequency range to be transformed; and determining, according to a vector length of the time domain signal and the time-frequency transform type, the transform kernel matrix corresponding to the target frequency range.

8. The signal processing method according to claim 7, wherein the frequency domain signal corresponding to the time domain signal comprises a frequency domain signal in the target frequency range, and the signal processing method further comprises:

performing windowing processing on the frequency domain signal in the target frequency range to obtain a windowed result;

determining a complete frequency domain signal according to the windowed result; and performing inverse transform on the complete frequency domain signal to obtain a transformed time domain signal.

9. The signal processing method according to claim 1, wherein the time-frequency transform type comprises any one of Discrete Fourier Transform, Discrete Cosine Transform, Fast Fourier Transform, or Chirp Z-Transform.

10. An electronic device, comprising:

a plurality of processing cores; and a network on chip configured for interacting data among the plurality of processing cores and external data, wherein one or more of the processing cores have stored thereon one or more instructions which, when executed by the one or more processing cores, cause the one or more of processing cores to implement the signal processing method according to claim 1.

11. A non-transitory computer-readable medium having a computer program stored thereon, wherein the computer program, when executed by a processing core, causes the signal processing method according to claim 1 to be implemented.

* * * * *